(12) United States Patent
Taylor et al.

(10) Patent No.: US 12,117,989 B1
(45) Date of Patent: Oct. 15, 2024

(54) REPLICATION TECHNIQUES WITH DATA COPY AVOIDANCE

(71) Applicant: Dell Products L.P., Hopkinton, MA (US)

(72) Inventors: Alan L. Taylor, Cary, NC (US); Nagapraveen Veeravenkata Seela, Cary, NC (US); David Bernard, Westford, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/464,626

(22) Filed: Sep. 11, 2023

(51) Int. Cl.
*G06F 16/20* (2019.01)
*G06F 16/23* (2019.01)
*G06F 16/27* (2019.01)

(52) U.S. Cl.
CPC ...... *G06F 16/2343* (2019.01); *G06F 16/2379* (2019.01); *G06F 16/273* (2019.01)

(58) Field of Classification Search
None
See application file for complete search history.

(56) References Cited

U.S. PATENT DOCUMENTS

| | | | |
|---|---|---|---|
| 11,513,716 B2 | 11/2022 | Haravu et al. | |
| 2014/0331013 A1* | 11/2014 | Ishii | G06F 12/0806 711/145 |
| 2014/0379959 A1* | 12/2014 | Canepa | G06F 12/0802 711/103 |

* cited by examiner

*Primary Examiner* — Jau Shya Meng
(74) *Attorney, Agent, or Firm* — Muirhead and Saturnelli, LLC

(57) ABSTRACT

Techniques can include: receiving from a component a bufferless read request to read data of a storage object; opening a first transaction; acquiring locks of data pages including the read data; locking cache pages; storing the read data in the cache pages; sending to the component a notification identifying references, pointers or addresses of the cache pages storing the read data; responsive to receiving the notification, the first component performing one or more operations including directly accessing the first data from the cache pages using the references, pointers or addresses; and responsive to successfully completing the one or more operations, performing second processing including: releasing or unlocking the set of one or more cache pages storing the first data; releasing the one or more locks of the one or more data pages including the first data; and closing the first transaction.

19 Claims, 9 Drawing Sheets

550

508

Responsive to receiving the notification, the first component performs one or more operations including directly accessing the first data from the cache using the one or more references, pointers or addresses of the one or more cache pages storing the first data.

In at least one embodiment, the one or more operations can include writing or replicating the first data from the source system to the target volume of the target system in accordance with the asynchronous replication configuration of the source and target volumes.

510

Responsive to successfully completing the one or more operations by the first component, releasing or unlocking the set of one or more cache pages of the cache of the source system storing the first data, releasing the locks on the data pages corresponding to the first data, and then closing the first transaction.

In at least one embodiment where the one or more operations is writing or replication the first data to the target volume of the target system, successfully completing the one or more operations can include receiving at the source system an acknowledgement from the target system regarding successful receipt of the replicated first data. The set of one or more cache pages and the read locks on the data pages are only unlocked or released after such acknowledgement is received at the source system.

500 ↘

502 — Receiving, from a first component, a bufferless read request to read first data from a first logical address LA1. LA1 can be a logical address expressed using a volume or LUN ID (identifier), such as LUN A, and an LBA or offset in the volume. More generally LA1 can refer to any suitable storage object.

In at least one embodiment, the first component can be copier 302c sending the bufferless read request to namespace 302a, where copier 302c and namespace 302a are included in a source system 302. LUN A can be a source volume of the source system configured for asynchronous replication to a corresponding target volume of a target system. The source and target volumes can both be configured to have the same identity of LUN A from the view of an external host or other client where the source and target volumes are exposed to the external host or other client. Paths to the target volume can be active where the host can issue I/Os directed to LUN A to the source system. Paths to the target volume can be passive where the host cannot issue I/Os directed to LUN A to the target system.

↓

504 — Responsive to receiving the bufferless read, opening a first transaction TX1, locking one or more data pages containing the first data, and storing the first data of LA1 in a set of one or more cache pages of a cache. The set of one or more cache pages is locked and remains locked for the duration of the first transaction TX1 as denoted while TX1 is open. The cache storing the first data can be included in the source system. The locks taken on the data pages containing the first data can be read locks corresponding to the LBA range of the LA1 where the first data is stored.

↓

506 — Responsive to storing the first data of LA1 in the set of one or more cache pages, notifying the first component. The notification can include one or more references, pointers or addresses of the corresponding one or more cache pages storing the requested first data.

↓

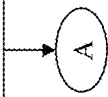

FIG. 8A

REPLICATION TECHNIQUES WITH DATA COPY AVOIDANCE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, from a first component, a bufferless read request to read first data from one or more logical addresses of a storage object; responsive to receiving the bufferless read request, performing first processing including: opening a first transaction; acquiring one or more locks of one or more data pages including the first data; locking a set of one or more cache pages of a cache; and storing the first data in the set of one or more cache pages; responsive to storing the first data in the set of one or more cache pages, sending a notification to the first component, wherein the notification identifies one or more references, pointers or addresses of the one or more cache pages of set storing the first data; responsive to receiving the notification, the first component performing one or more operations including directly accessing the first data from the cache using the one or more references, pointers or addresses; and responsive to successfully completing the one or more operations, performing second processing including: releasing or unlocking the set of one or more cache pages storing the first data; releasing the one or more locks of the one or more data pages including the first data; and closing the first transaction.

In at least one embodiment, the first component can be a copier component copying a set of data changes of a source volume of a source system to a corresponding target volume of a target system, and wherein the source volume can be the storage object identified in the bufferless read request. The source volume and the target volume can be included in an asynchronous replication configuration where writes or data changes made to the source volume can be asynchronously replicated to the target volume.

In at least one embodiment, processing can include: taking a plurality of replication snapshots of the source volume on the source system at a plurality of corresponding points in times; and determining a first set of data changes between a first and a second of the plurality of replication snapshots, where the first and the second of the plurality of replication snapshots are consecutively taken replication snapshots, and wherein the one or more logical addresses of the bufferless read request include at least a portion of the first set of data changes. The one or more operations performed by the copier component can include directly accessing the first data from the cache using the one or more references, pointers or addresses for replication from the source system to a target volume of the target system. The source volume and the target volume can both be configured to have a same identity of a logical volume when exposed to a host. The source volume can be exposed to the host over one or more first paths between the host and the source system and wherein the one or more first paths can be designated as active where the host issues I/O requests to the source volume configured as the logical volume over the one or more first paths. The target volume can be exposed to the host over one or more second paths between the host and the target system and wherein the one or more second paths can be designated as passive where the host is unable to issue I/O requests to the target volume configured as the logical volume over the one or more second paths.

In at least one embodiment, the set of one or more cache pages storing the first data can remain locked for the duration of the first transaction thereby resulting in the first data being retained in the cache for the duration of the first transaction while open. The one or more locks taken on the one or more data pages including the first data can be one or more read locks. Each of the one or more read locks taken on the one or more data pages including the first data can be a read lock on a corresponding one of the one or more data pages. Each of the one or more read locks taken on a corresponding one of the one or more data pages can allow additional readers to take corresponding additional read locks on the corresponding one data page but may not allow any writer to take a corresponding write lock on the corresponding one data page.

In at least one embodiment, processing can include dynamically determining, in accordance with one or more criteria, whether the first component performs a first read request that reads the first data using the bufferless read request or a buffered read request. The buffered read request can include a read buffer as an input parameter. The read buffer can be pre-allocated by a client prior to issuing the buffered read request. Processing of the buffered read request to read second content from one or more locations can include: storing the second content in the cache; copying the second content from the cache to the read buffer; and returning the read buffer with the second content in response to the buffered read request. The bufferless read request may not include the read buffer as an input parameter and may omit copying requested read data from the cache into the read buffer whereby the requested read data can be alternatively directly accessed from the cache. The one or more criteria can include any one or more of: a current cache utilization of the cache; an amount of free cache; a predicted cache utilization; and one or more characteristics of a current I/O workload of a system including the cache. The one or more criteria can specify to selectively use the buffered read request rather than the bufferless read request based, at least in part, on one or more criteria including any one or more of: a current cache utilization exceeding a threshold; an amount of free cache falling below a threshold; a predicted cache utilization exceeding a threshold; a current I/O workload; and/or a particular application or component performing the first read request. The storage object can be any of: a volume, a logical device, a file, and a file system.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 8A and 8B form a flowchart of processing steps that can be performed in at least one embodiment in accordance with the techniques of the present disclosure.

DETAILED DESCRIPTION OF EMBODIMENT(S)

Figure 1:
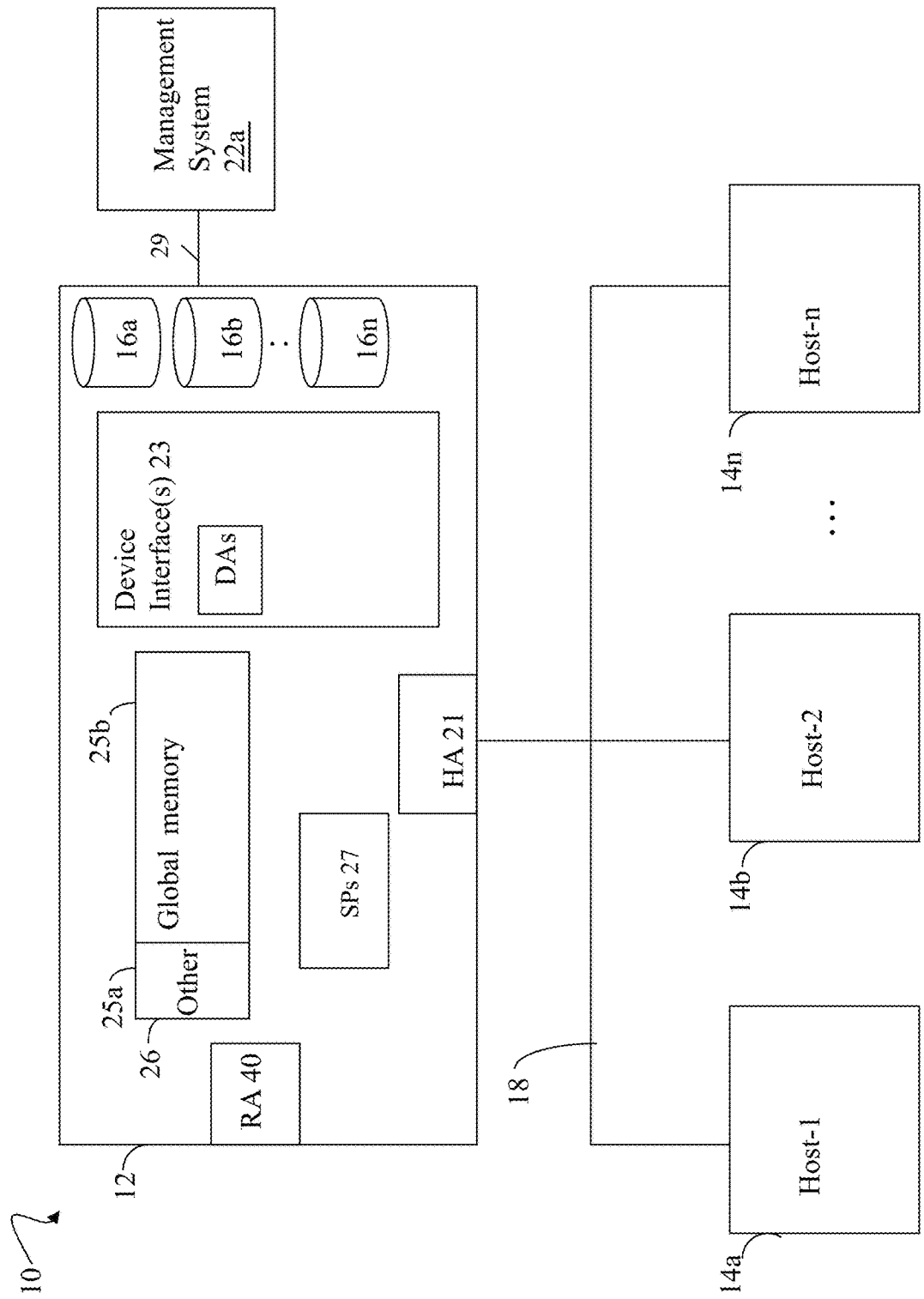
FIG. 1 is an example of components that can be included in a system in accordance with the techniques of the present disclosure.

Data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote storage object on the remote system. The remote storage object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be replicated to a corresponding remote target storage object on the remote target system.

One mode or methodology of remote replication can be referred to as asynchronous remote replication where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote storage object on the target system is allowed to be with respect to the source or primary copy of the storage object on the source system. Thus, with asynchronous replication configured for a source storage object and a remote storage object, the remote storage object and the source storage object can denote different point in time copies. The source storage object denotes the most up to date version of the storage object and the remote storage object denotes an earlier or prior version of the storage object than the source storage object.

Different techniques can be used to track changes of the primary copy of the source storage object on the source system that need to be replicated to the remote storage object over time, where such changes denote written or changed data that is replicated from the source to the remote target system.

Described in the following paragraphs are techniques that can be used for efficient asynchronous replication in at least one embodiment.

In at least one embodiment, the techniques of the present disclosure provide an improved and efficient method of obtaining changed data or written data that is replicated from the source system to the target system which, in contrast to at least one existing system, can avoid a data copy in the asynchronous replication runtime path.

In at least one existing system not in accordance with the techniques of the present disclosure, changed data or written data to be replicated can be stored in the cache of the source system, and copied from the source system's cache to a read buffer of the source system. The source system can then replicate the copied data of the read buffer of the source system to the target system. The cache portions storing the changed or written data can be freed or reused after copying to the read buffer. Thus, in a system not in accordance with the techniques of the present disclosure, the changed or written may not be retained in cache of the source system until replicated to the target system.

In at least one embodiment, the techniques of the present disclosure include retaining the changed or written data to be replicated in the cache of the source system until the changed or written data has been replicated from the source to the target system. Additionally in at least one embodiment, the techniques of the present disclosure further provide for taking advantage of the fact that the changed or written data to be replicated remains in the cache of the source system until the changed or written data has been replicated from the source to the target system. In at least one embodiment, the changed or written data can remain in the source system's cache for the duration of an extended transaction, where the duration of the extended transaction can span a time period including: initially storing the changed data in the source system's cache, replicating the changed data from the source to the target system, and receiving an acknowledgement from the target system that the changed data has been successfully received and committed. By retaining the changed data to be replicated in the source system cache as noted above in at least one embodiment, processing can be performed in connection with replicating the changed data directly using the cached copy of the changed data rather than, for example, an additional copy of the changed data stored in a read buffer.

In at least one embodiment, the techniques of the present disclosure can include a transit component of the data path directly accessing the changed or written data from the source system's cache for replication to the target system rather than from an intervening read buffer as noted above. The additional copying of the data from the cache of the source system to the read buffer of the source system noted above can be omitted by the transit component directly accessing the data changes to be replicated from the source system cache. Thus in at least one embodiment, the techniques of the present disclosure provide for an improvement in performance of asynchronous replication by avoiding the above-noted copying of replicated data from the source system's cache to the read buffer of the source system.

In at least one embodiment, the techniques of the present disclosure can utilize a "bufferless read" interface that is a call issued in the runtime call chain or call stack of the data path. In at least one embodiment, the bufferless read interface can be a call issued to a namespace component by a namespace or cache client layer or component. Generally, the namespace component in at least one embodiment can be a logical volume manager providing interfaces for reading and writing data from volumes, snapshots, and the like. In at least one embodiment, the bufferless read can be one such provided interface of the namespace component. The bufferless read interface can omit a pointer to a pre-allocated read buffer and can further issue a call to a transactional cache (Txcache) layer or component. In at least one embodiment, the bufferless read can be issued to read changed data to be replicated from the source system to the target system as part of asynchronous replication. The Txcache can return to the namespace component a reference or pointer to cache pages of changed data to be replicated. In turn, the bufferless read can be used to provide clients of the Txcache layer and namespace component the reference or pointer to the cache pages of changed data to be replicated. In this manner, the reference or pointer to the cache pages of changed data to be replicated can be directly provided to clients of Txcache and namespace to thereby allow such clients to directly access and replicate the changed data from the cache.

In at least one embodiment not in accordance with the techniques of the present disclosure, a buffered read interface can be utilized rather than the bufferless read. The buffered read interface can be an interface that is a call to the namespace component by a namespace client, where the buffered read interface can include a preallocated client read buffer. With the buffered read interface, the client calling namespace, and thus Txcache, can allocate storage for the read buffer prior to making the buffered read call, and the client can pass the read buffer (or pointer or reference thereto) as an input parameter of the buffered read call. In response, namespace can copy the changed data or read data from the cache to the read buffer, and return the populated read buffer with the changed data to the namespace client. Subsequently not in accordance with the techniques of the present disclosure, the copy of the changed data can then be replicated from the read buffer to the target system.

With the bufferless read interface of the present disclosure in contrast to the above-noted buffered read interface, the namespace client does not have to allocate a read buffer which namespace then uses to store a copy of the changed data. Rather, in at least one embodiment of the techniques of the present disclosure using the bufferless read interface, namespace can directly return a pointer or reference to the changed data as stored in the cache to the namespace client thereby avoiding the process of copying the changed data from the cache to the read buffer. In accordance with the present disclosure, the changed data can then be directly accessed from the cache of the source system by the namespace client for purposes of asynchronous replication.

The techniques of the present disclosure can also more generally be utilized in connection with any suitable namespace or Txcache client and application or usage. For example, the techniques of the present disclosure can be used in connection with components for replication of changed or written data for asynchronous replication as noted above to avoid a data copy in the asynchronous replication runtime path. Additionally in at least one embodiment, the techniques of the present disclosure can be used in connection with performing a bufferless read to service host or other external client read I/Os where the requested read data can be returned up the runtime call chain or stack. In particular in at least one embodiment, the techniques of the present disclosure can be used in connection with servicing a read such as a client read I/O from a host external to the data storage system. In connection with a read I/O, the read data requested can be a cache hit where the data is already stored in cache, or other a cache miss. Read cache miss processing can include the Txcache component obtaining the requested read data from backend (BE) non-volatile storage and storing the read data in cache. In at least one embodiment, a front-end (FE) component of the storage system can receive the read I/O operation from a host or other client. Using the bufferless read in at least one embodiment, the FE component can be provided with a reference or pointer directly to the cached read data so that the FE component can directly reference the cached copy of the read data to service the read I/O. In this manner in at least one embodiment, the FE component or other suitable component of the runtime call stack can perform a bufferless read call rather than a buffered read, where the buffered read would incur performance penalties due to the additional data copying to the client allocated read buffer. Consistent with discussion above and elsewhere herein, a client of the buffered read not in accordance with the techniques of the present disclosure can allocate storage for the read buffer provided as an input parameter of the buffered read call. Processing of the buffered read can undesirably include copying read data from the cache to the read buffer returned to the client. In contrast to the buffered read, the improved bufferless read of the present disclosure in at least one embodiment provides for omitting the foregoing data copying of the read data from the cache to the read buffer and rather provides the client direct access to the cached read data.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
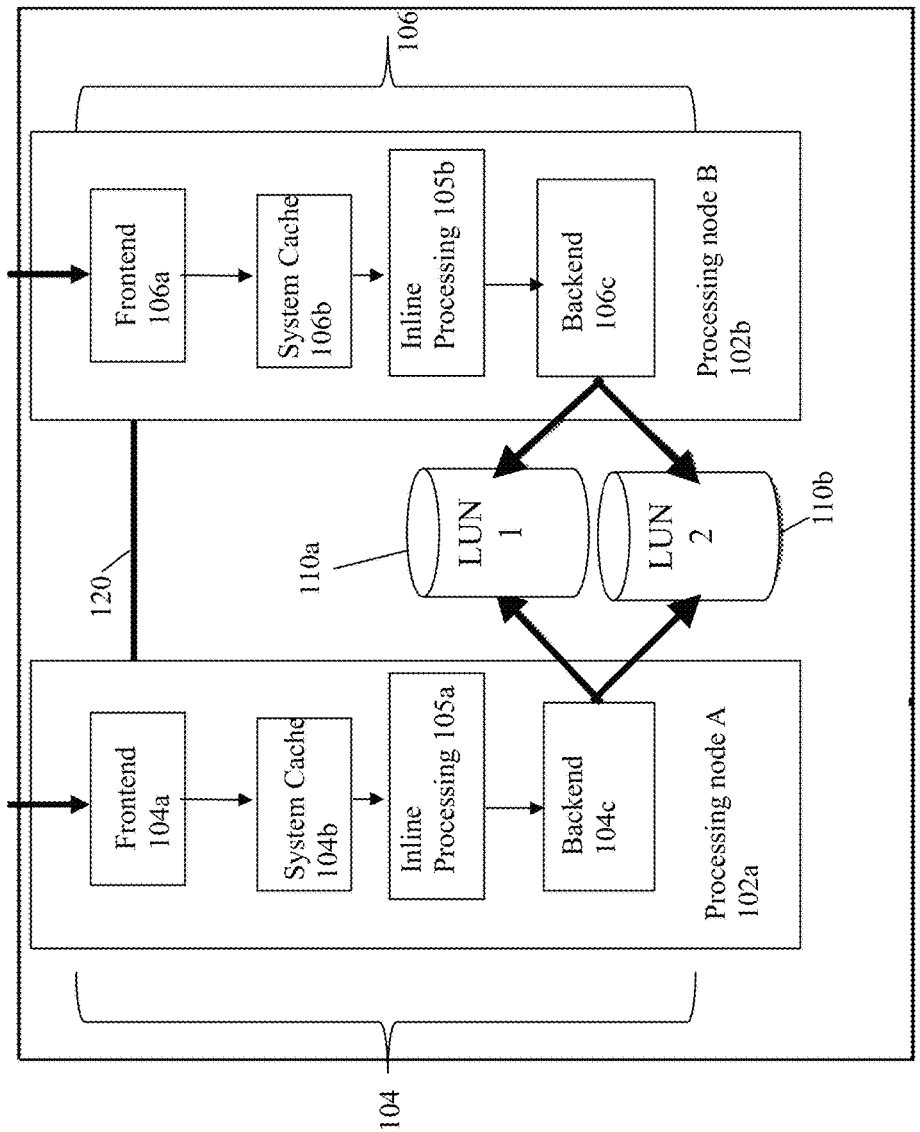
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as an asynchronous mode described elsewhere herein.

Figure 3:
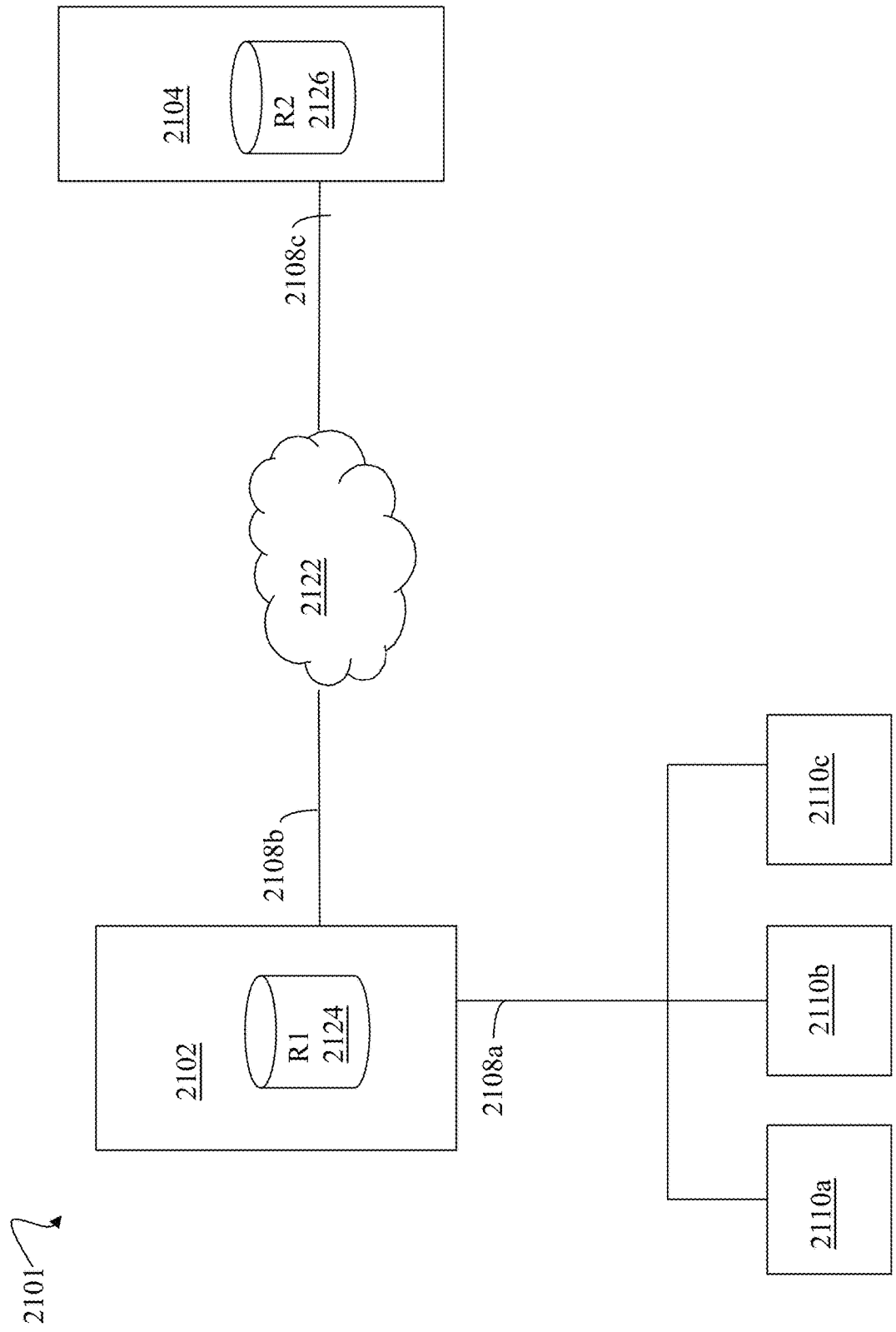
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110*a*, 2110*b* and 1210*c*. The data storage systems 2102, 2104 can be remotely connected and communicate over the network 2122, such as the Internet or other private network, and facilitate communications with the components connected thereto. The hosts 2110*a*, 2110*b* and 2110*c* can issue I/Os and other operations, commands, or requests to the data storage system 2102 over the connection 2108*a*. The hosts 2110*a*, 2110*b* and 2110*c* can be connected to the data storage system 2102 through the connection 2108*a* which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110*a*, 2110*b* and 2110*c*. The data storage system 2104 can be characterized as remote with respect to the hosts 2110*a*, 2110*b* and 2110*c*. The R1 and R2 devices can be configured as LUNs.

The host 2110*a* can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary or production storage device and a second storage device, such as R2, as a secondary storage device. In this example, the host 2110*a* interacts directly with the device R1 of the data storage system 2102, and any data changes made are automatically provided to the R2 device of the data storage system 2104 by a remote replication facility (RRF). In operation, the host 2110*a* can read and write data using the R1 volume in 2102, and the RRF can handle the automatic copying and updating of data from R1 to R2 in the data storage system 2104. Communications between the storage systems 2102 and 2104 can be made over connections 2108*b*, 2108*c* to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With asynchronous mode remote data replication in at least one embodiment, a host 2110*a* can issue a write to the R1 device 2124. The primary or R1 data storage system 2102 can generally commit the write operation. The system 2102 can commit the write operation, for example, such as by storing the write data in its cache at a cache location and marking the cache location as including write pending (WP) data as mentioned elsewhere herein. As another example, the system 2102 can commit the write operation, for example, such as by recording the write operation in a persistent transaction log. At a later point in time, the write data is destaged, such as from the cache of the R1 system 2102 or the transaction log, to physical storage provisioned for the R1 device 2124 configured as the LUN A. Once the system 2102 has committed the write, the system 2102 can return an acknowledgement to the host 2110*a* regarding completion of the write. Thus, the acknowledgement sent from the system 2102 to the host 2110*a* regarding completion of the write is sent independent of any replication or communication of the write to the remote R2 system 2104. Additionally, the RRF operating in the asynchronous mode can replicate or propagate the write across an established connection or link (more generally referred to as a the remote replication link or link) such as over 2108*b*, 2122, and 2108*c*, to the secondary or R2 data storage system 2104 where the write can be committed on the system 2104. The system 2104 can generally commit the write in any suitable manner such as similar to described above in connection with the R1 system 2102. Subsequently, the write can be destaged, for example, from the cache of the R2 system 2104 or the transaction log of the R2 system 2104, to physical storage provisioned for the R2 device 2126 configured as the LUN A. Once the R2 system 2104 has committed the write, the R2 system 2104 can return an acknowledgement to the R1 system 2102 that it has received the replicated write. Thus, generally, R1 device 2124 and R2 device 2126 can be logical devices, such as LUNs, configured as asynchronous copies of one another, where there is some acceptable level of data difference between the R1 and R2 devices and where R1 represents the most recent or up to date version. R1 and R2 devices can be, for example, fully provisioned LUNs, such as thick LUNs, or can be LUNs that are thin or virtually provisioned logical devices.

Figure 4:
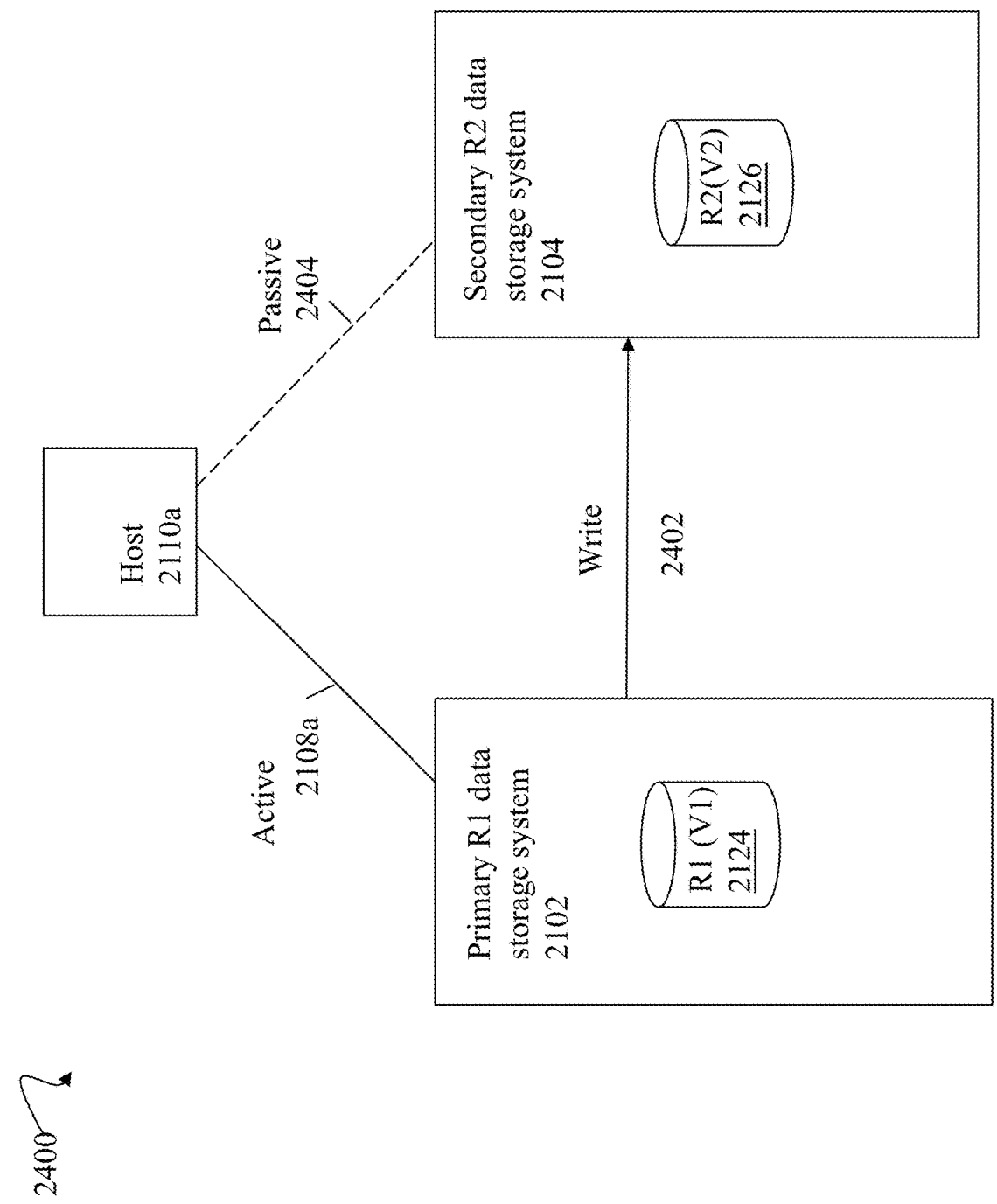
FIG. 4 is an example illustrating a replication configuration in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in asynchronous replication mode in the embodiment of FIG. 4, the host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration with asynchronous replication performed from the R1 data storage system 2102 to the secondary R2 system 2104. With the active-passive configuration of FIG. 4, the host 2110a has an active connection or path 2108a over which all I/Os are issued to only the R1 data storage system. The host 2110a can have a passive connection or path 2404 to the R2 data storage system 2104. Writes issued over path 2108a to the R1 system 2102 can be asynchronously replicated to the R2 system 2104.

In at least one embodiment of the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued whereby the host is not permitted to access the LUN A for I/Os over path 2404). For example, in a SCSI-based environment, the devices 2124 and 2126 can be configured to have the same logical device identifier such as the same world-wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A. Alternatively, recovery processing can include copying content from R2 device 2126 of the R2 system 2104 to the R1 device 2124 of the R1 system 2102 to thereby restore R1 2124. Subsequent to restoring R1 2124, the host 2110a can resume issuing I/Os to R1 2124 over path 2108a where any write I/Os directed to R1 2124 can be replicated and applied in an asynchronous manner to R2 2126 on the storage system 2104.

In at least one embodiment, the pair of devices or volumes including the R1 device 2124 and the R2 device 2126 can be configured as the same single volume or LUN, such as LUN A, to expose the two different devices or volumes (e.g., V1 or R1 2124; V2 or R2 2326), on two different data storage systems 2102, 2104 to the host 2110a as the same single volume or LUN. Thus, from the view of the host 2110a, the same LUN A is exposed and thus discoverable over the two paths 2108a and 2404, where R1/V1 and R2/V2 are both configured as the same logical volume or LUN A and where R1/V1 and R2/V2 both have the same identity as presented, viewed or exposed to an external host. However in at least one embodiment, host I/Os directed to LUN A sent over active path 2108a can be serviced, and where host I/Os directed to LUN A may not be sent over passive path 2404 and may not be serviced.

It should be noted although only a single replication link 2402 is illustrated, more generally any number of replication links can be used in connection with replicating data from systems 2102 to system 2104.

Although examples in the following paragraphs refer to a volume or LUN, more generally, the techniques of the present disclosure can be generalized for use with a storage object or resource which can be a volume or LUN, a file system, a virtual volume or vvol used in connection with virtual machines, and any other suitable storage resource or object.

Generally, the primary or R1 storage system 2102 can also be referred to as a source system or site; the secondary or R2 storage system 2104 can also be referred to as a destination, target or disaster recovery (DR) system or site; the R1/V1 device 2124 can also be referred to as a production or source volume or LUN having a corresponding R2/V2 device 2126 which can also be referred to as a target, destination or replica volume or LUN.

As discussed above, data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote storage object on the remote system. The remote storage object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be replicated to a corresponding remote target storage object on the remote target system.

Consistent with other discussion herein, one mode or methodology of remote replication is asynchronous remote replication such as illustrated in a replication configuration of FIG. 4, where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote storage object on the target system is allowed to be with respect to the source or primary copy of the storage object on the source system. Thus, with asynchronous replication configured for a source storage object and a remote storage object, the remote storage object and the source storage object can denote different point in time copies. The source storage object denotes the most up to date version of the storage object and the remote storage object denotes an earlier or prior version of the storage object than the source storage object.

Different techniques can be used to track changes of the primary copy of the source storage object on the source system that need to be replicated to the remote storage object over time, where such changes denote written or changed data that is replicated from the source to the remote target system.

Described in the following paragraphs are techniques of the present disclosure that can be used for efficient asynchronous replication in at least one embodiment such as in an asynchronous remote replication configuration as in FIG. 4.

The techniques of the present disclosure provide an improved and efficient method of obtaining changed data or written data that is replicated from the source system to the target system which, in contrast to at least one existing system, can avoid a data copy such as, for example, in connection with asynchronous replication.

In at least one existing system not in accordance with the techniques of the present disclosure, changed data or written data to be replicated can be stored in the cache of the source system, and copied from the source system's cache to a read buffer of the source system. The source system can then replicate the copied data of the read buffer of the source system to the target system. The cache portions storing the changed or written data can be freed or reused after copying to the read buffer. Thus, in a system not in accordance with the techniques of the present disclosure, the changed or written data is not retained in cache of the source system until replicated to the target system.

In at least one embodiment, the techniques of the present disclosure include retaining the changed or written data to be replicated in the cache of the source system until the changed or written data has been replicated from the source to the target system. Additionally in at least one embodiment, the techniques of the present disclosure further provide for taking advantage of the fact that the changed or written data to be replicated remains in the cache of the source system until the changed or written data has been replicated from the source to the target system. In at least one embodiment, the changed or written data can remain in the source system's cache for the duration of an extended transaction that can include initially storing the changed data in the source system's cache, and can further include replicating the changed data from the source to the target system, and can also include receiving an acknowledgement from the target system that the changed data has been successfully received and committed.

In at least one embodiment, the techniques of the present disclosure can include a transit component of the data path directly accessing the changed or written data from the source system's cache for replication to the target system rather than from an intervening read buffer as noted above. The additional copying of the data from the cache of the source system to the read buffer of the source system noted above can be omitted by the transit component directly accessing the data changes to be replicated from the source system cache. Thus in at least one embodiment, the techniques of the present disclosure provide for an improvement in performance of asynchronous replication by avoiding the above-noted copying of replicated data from the source system's cache to the read buffer of the source system.

In at least one embodiment, the techniques of the present disclosure can utilize a "bufferless read" interface that is a call issued in the runtime call chain or call stack of the data path. In at least one embodiment, the bufferless read interface can be a call issued to a namespace component by a client layer or component. Generally, the namespace component in at least one embodiment can be a logical volume manager providing interfaces for reading and writing data from volumes, snapshots, and the like. The bufferless read interface can omit a pointer to a read buffer and can further issue a call to a transactional cache (Txcache) layer or component. In at least one embodiment, the bufferless read can be issued to read changed data to be replicated from the source system to the target system as part of asynchronous replication. The Txcache can return to the namespace component a reference or pointer to cache pages of changed data to be replicated. In turn, the bufferless read can be used to provide clients of the Txcache layer and namespace component a reference or pointer to the cache pages of changed data to be replicated. In this manner, the reference or pointer to the cache pages of changed data to be replicated can be directly provided to clients of Txcache and namespace to thereby allow such clients to directly access and replicate the changed data from the cache.

In at least one embodiment not in accordance with the techniques of the present disclosure, a buffered read interface can be utilized rather than the bufferless read. The buffered read interface can be an interface that is a call to the namespace component by a namespace client, where the buffered read interface can include a preallocated client read buffer. With the buffered read interface, the client calling namespace, and thus Txcache, can allocate storage for the read buffer prior to making the buffered read call, and the client can pass the read buffer (or pointer or reference thereto) as an input parameter of the buffered read call. In response, namespace can copy the changed data or read data from the cache to the read buffer, and return the populated read buffer with the changed data to the namespace client. Subsequently not in accordance with the techniques of the present disclosure, the copy of the changed data can then be replicated from the read buffer to the target system.

With the bufferless read interface of the present disclosure in contrast to the above-noted buffered read interface, the namespace client does not have to allocate a read buffer which namespace then uses to store a copy of the changed data. Rather, in at least one embodiment of the techniques of the present disclosure using the bufferless read interface, namespace can return a pointer or reference to the changed data as stored in the cache to the namespace client thereby avoiding the process of copying the changed data from the cache to the read buffer. In accordance with the present disclosure, the changed data can then be directly accessed from the cache of the source system by the namespace client for purposes of asynchronous replication.

The techniques of the present disclosure can also more generally be utilized in connection with any suitable namespace or Txcache client and application or usage. For example, the techniques of the present disclosure can be used in connection with components for replication of changed or written data for asynchronous replication as noted above to avoid a data copy in the asynchronous replication runtime path. Additionally in at least one embodiment, the techniques of the present disclosure can be used in connection with components for servicing host or other external client read I/Os where the requested read data can be returned up the runtime call chain or stack. In particular in at least one embodiment, the techniques of the present disclosure can be used in connection with servicing a read such as a client read I/O from a host external to the data storage system. In connection with a read I/O, the read data requested can be a cache hit where the data is already stored in cache, or other a cache miss. Read cache miss processing can include the Txcache component obtaining the requested read data from backend (BE) non-volatile storage and storing the read data in cache. In at least one embodiment, a front-end (FE) component of the storage system can receive the read I/O operation from a host or other client. Using the bufferless read in at least one embodiment, the FE component can be provided with a reference or pointer directly to the cached read data so that the FE component can directly reference the cached copy of the read data to service the read I/O. In this manner in at least one embodiment, the FE component can use the bufferless read rather than the buffered read which would incur performance penalties due to the additional data copying. Consistent with discussion above and elsewhere herein, a client of the buffered read not in accordance with the techniques of the present disclosure can allocate storage for the read buffer provided as an input parameter of the buffered read call. Processing of the buffered read can undesirably include copying read data from the cache to the read buffer returned to the client. In contrast to the buffered read, the improved bufferless read of the present disclosure in at least one embodiment provides for omitting the foregoing data copying of the read data from the cache to the read buffer and rather provides the client direct access to the cached read data.

In at least one embodiment, the FE component can be a client of namespace and, more generally, perform a call using the bufferless read in a manner similar to the copier component discussed herein. More generally, the namespace and/or bufferless read client can be any suitable component in connection with any suitable application or use.

The foregoing and other aspects of the techniques of the present disclosure are described in more detail in the following paragraphs.

In at least one embodiment in accordance with the techniques of the present disclosure, asynchronous remote replication can be performed by a remote replication service or facility executing on the source system where the remote replication facility can use a technique referred to as a snapshot difference or snap diff technique. The snap diff technique provides for taking two successive snapshots of the logical device or other storage object on the source system that is replicated on the target system, and then determining the data difference with respect to the two successive snapshots. The data difference denotes the data blocks that have been written or modified in the time interval from a first point in time to a second later point in time, where a first snapshot is taken at the first point in time and a second successive snapshot is taken at the second point in time. The time interval may correspond, for example, to a recovery point objective (RPO) defined as the maximum amount of allowable data loss, as measured by time, that can be lost after a recovery from a disaster, failure, or comparable event before data loss will exceed what is acceptable to an organization. The snap diff technique can provide for taking a snapshot at each RPO interval. For example, for an RPO of 30 minutes, a snapshot of the logical device can be taken on the source system at periodic time intervals generally less than 30 minutes and compared to the immediately prior snapshot to determine the data differences including data blocks that have been modified since the immediately prior snapshot. The data differences including the modified or newly written data blocks of the logical device (e.g., written since the first point in time of first snapshot up to the second point in time of the second snapshot) are then transferred from the source system to the target system and applied to the remote copy of the logical device on the target or remote system. In at least one embodiment, the periodic time interval at which successive snapshots of the source volume or object is taken for asynchronous replication can be approximately ½ of the specified RPO. Thus, for example with an RPO=30 minutes, the periodic time interval for asynchronous related snapshots can be approximately every 15 minutes (e.g., every 15 minutes+/−an allowable time window). As the amount of data changes made to the source volume or object increases, an embodiment can adjust the frequency at which successive snapshots are taken as well as use additional suitable techniques to facilitate meeting the specified RPO.

To further illustrate, consider such as illustrated in FIG. 4 an asynchronous replication configuration of a source LUN of a source system and a target LUN of a target system, where the source LUN and the target LUN are configured to be viewed by an external host as the same LUN, LUN A. Assume further that the asynchronous replication configuration is configured with an RPO of 30 minutes or other suitable time. The snap diff technique generally takes snapshots of the source LUN or object at a frequency that is less than the RPO in an ongoing continuous manner. For example, successive snapshots of the source LUN can be taken at approximately every 15 minute interval. The data differences between two successive snapshots can be determined and can form the incremental data updates or writes replicated from the source system to the target system, where such replicated writes are committed and applied to the corresponding target LUN on the target system.

Figure 5:
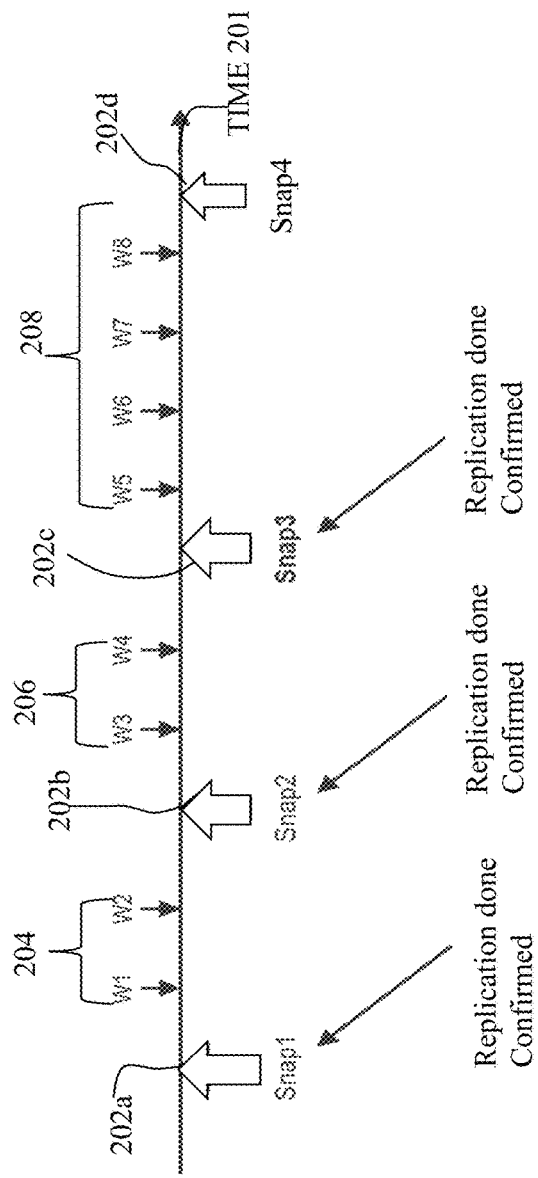
FIG. 5 is an example illustrating use of a snapshot difference technique to determine data differences for a replication configuration in at least one embodiment in accordance with the techniques of the present disclosure.

Referring to FIG. 5, shown is an example 200 illustrating use of snapshots in connection with asynchronous replication in at least one embodiment in accordance with the techniques of the present disclosure.

The example 200 illustrates replication related snapshots 202*a-d* taken at various points in time along a timeline 201. The snapshot snap1 202*a* is taken at a first point in time P1 and can be marked as a replication related snapshot. The snapshot snap2 202*b* is taken at a second point in time P2 (subsequent to taking snap1 202*a* at P1) and can be a marked as a replication related snapshot. The snapshot snap3 202*c* is taken at a third point in time P3 (subsequent to taking snap2 202*b* at P2) and can be marked as a replication related snapshot. The snapshot snap4 202*d* is taken at a fourth point in time P4 (subsequent to taking snap3 202*c* at P3). The writes W1 and W2 of 204 denote the writes occurring between taking snapshots 202*a* and 202*b*, whereby writes of 204 denote data changes between snapshots 202*a-b*. The writes W3 and W4 of 206 denote the writes occurring between taking snapshots 202*b* and 202*c*, whereby the writes of 206 denote data changes between snapshots 202*b-c*. The writes W5-W8 of 208 denote the writes occurring between taking snapshots 202*c* and 202*d* whereby the writes of 208 denote data changes between the snapshots 202*c-d*. Consistent with discussion above, the writes 204 can denote the replicated writes determined as a result of taking the snap diff with respect to snapshots 202*b* and 202*a*; the writes 206 can denote the replicated writes determined as a result of taking the snap diff with respect to the snapshots 202*b* and 202*c*; and the writes 208 can be included in the set of replicated writes determined as a result of taking the snap diff with respect to the snapshot 202*c* and the next consecutive snapshot snap4 202*d*.

Consistent with other discussion herein in connection with at least one embodiment in accordance with the techniques of the present disclosure, records of the writes 204 of can remain in the cache until the writes 204 have been replicated from the source system to the target system whereby the replication of such subsequent writes 204 following the snap 202*a* are confirmed as committed on the target system. Records of the writes 206 can remain in the cache until the writes 206 have been replicated from the source system to the target system whereby the replication of such subsequent writes 206 following the snap 202*b* are confirmed as committed on the target system. Records of the writes 208 can remain in the cache until the writes 208 have been replicated from the source system to the target system whereby the replication of such subsequent writes 208 following the snap 202*c* are confirmed as committed on the target system.

In at least one embodiment as discussed herein, a snapshot difference or snap diff operation can be performed with respect to two consecutive replication related snapshots snap "N" and snap "N+1" (e.g., denoted as snap diff (N, N+1)) of a source volume SV to determine the modified blocks between snap N and snap N+1. In at least one embodiment the snap diff operation can use a list of modified blocks maintained by a mapper layer to determine which blocks of SV are marked as modified between the time when snapshot N is taken and when snapshot N+1 is taken. Thus in at least one embodiment, the snap diff operation, snap diff (N, N+1), can return a list of blocks of the volume SV which have been modified between snapshots N and N+1. Let T denote the time interval between when snapshots N and N+1 are taken. Thus the list returned by the snap diff (N, N+1) identifies, in the aggregate, the blocks of the volume SV modified or written to with write data or content during the time interval T between when the snapshots N and N+1 are taken (e.g., for writes from hosts directed to LUN A where such writes are received and serviced by the source system or site during the time interval T).

In at least one embodiment, the replication snapshot operation N and all subsequent writes prior to the next successive replication snapshot N+1 taken for replication can be held or retained in the cache until all such subsequent writes have been replicated to the target system where the target system has confirmed or acknowledged the replication of such writes.

In at least one embodiment, the control path can generally control and orchestrate asynchronous replication where, for example, a customer can specify an RPO target for a replication configuration such as illustrated in FIG. 4. In at least one embodiment, the control path can periodically instruct the data path to perform the asynchronous replication in order to meet the specified RPO target or objective of the asynchronous replication configuration such as of FIG. 4.

In at least one embodiment, the data path can generally track data changes of the source volume or storage object on the source system, where the tracked changes are those that need to be replicated to the target volume or storage object of the target system. In at least one embodiment, such data changes can be read from a replication related snapshot of the source volume and written to the target volume of the target system on each replication cycle.

In at least one embodiment, several components of the source system can perform at least some of the processing in each periodic replication cycle. In at least one embodiment, a namespace component can provide interfaces for reading and writing data. In at least one embodiment, the namespace component can be a logical volume manager or LVM that exports or provides access to volumes, maintains snapshots, and the like. In at least one embodiment, asynchronous replication processing can track data changes, such as noted above, using snapshots and determining snap diffs denoting data differences between pairs of consecutive snapshots of a source volume or object. In at least one embodiment, the data differences or data changes of a snapshot difference between two consecutive snapshots of a source volume or object can be expressed using a bitmap or other suitable structure or technique. In at least one embodiment, the bitmap can include an entry or cell for each block or other data portion of the source volume where the entry can have a value of 1 if the entry's corresponding block of data has changed ad needs to be replicated, and otherwise where the entry can have a value of 0.

In at least one embodiment, a copier component of the source system can query the namespace component of the source system for tracked changes of data blocks of the source volume or object to be replicated to the target system. The tracked changes can be returned, such as in the form of bitmaps in one embodiment, to the copier component thereby identifying the regions or logical addresses of changed data that need to be read and then written or replicated to the target system.

In at least one embodiment, a Txcache component can handle loading content or data read from BE PDs (e.g. BE non-volatile storage) into cache pages. More generally, the Txcache can manage the cache and ensure that requested data such as for a read request is in cache. In connection with use of a buffered read not in accordance with the techniques of the present disclosure, namespace can interact with Txcache to receive the cached read data and then namespace can copy the read data from the cache into namespace-client allocated read buffers. The copier component can be a client of namespace thereby making a runtime call to namespace using the buffered read. In this context using the buffered read, copier is a client of namespace where copier pre-allocates the read buffer for storing the cached read data prior to performing the buffered read call to namespace. Namespace can then copy the data from the cache pages into the copier's allocated read buffer, and return the populated read buffer to copier. In a system not in accordance with the techniques of the present disclosure using the buffered read for asynchronous replication, copier can then access the changed data from the read buffer for replication to the target system.

Consistent with other discussion herein, the techniques of the present disclosure in at least one embodiment can utilize a bufferless read interface when making a call to the namespace component to read changed data to be replicated from the source system to the target system. In at least one embodiment, the bufferless read call made from copier to namespace can be performed in connection with asynchronous replication to read requested data to be copied or replicated from the source system to the target system. As discussed in more detail elsewhere herein, the bufferless read can be further characterized and sometimes referred to as an optimized read as compared to a buffered read. Generally, overhead processing of the buffered read can be incurred when allocating a read buffer such as from memory, and copying data such as from cache to the read buffer. In at least one embodiment, the bufferless read call from copier to namespace omits copier allocating storage for the read buffer (e.g., that is passed as a parameter in the buffered read call) and thus further avoids copying data from cache to the read buffer. At runtime, a bufferless read call from copier to namespace further results in namespace requesting that Txcache store requested read data in pages of cache. Responsive to storing the requested read data in cache, a pointer or reference to the pages of cache storing the requested read data can be propagated back up the runtime stack from namespace to copier, where copier can then replicate the requested read data denoting the changed data of asynchronous replication to the target system. In at least one embodiment, a callback can be performed responsive to the requested read data being stored in cache. The callback can be a callback to copier where copier can be provided with a reference or pointer directly to the pages in cache storing the requested read data. Thus, the reference or pointer to the pages in cache storing the requested read data can be returned to copier. Copier can then user the reference or pointer to the pages in cache to further access the data to be replicated directly from the source system's cache. In at least one embodiment depending on processing performed by copier and other components in replicating the data changes to the target system, copier and/or the other components can directly access the data changes as stored in the source system's cache.

Additionally in at least one embodiment, the techniques of the present disclosure can utilize a technique sometimes referred to herein as a RunIn Txn (transaction) technique or protocol on the read path. In at least one embodiment, the RunIn Txn protocol can be used in connection with the bufferless read processing to provide Txcache and/or namespace clients, such as copier, with a pointer or reference to cache pages storing requested read data. Copier can then directly access the data changes to be replicated from the cache pages. In this manner in at least one embodiment, additional data copying of cached data to a preallocated read buffer, such as performed by namespace in connection with a buffered read, can be avoided. With the RunIn Txn protocol with a bufferless read in at least one embodiment, the RunIn Txn can be an instruction to replicate the content or read data of the bufferless read as stored in cache to the target system within the context of a currently open transaction on the source system. Put another way, the RunIn Txn protocol can provide for extending the currently open transaction on the source system for the bufferless read to remain open while the read data stored in cache is replicated to the target system. In at least one embodiment, only after the read data is replicated from the source system's cache to the target system is the transaction on the source system closed, associated cache pages storing the read data freed, and associated locks released.

Figure 6:
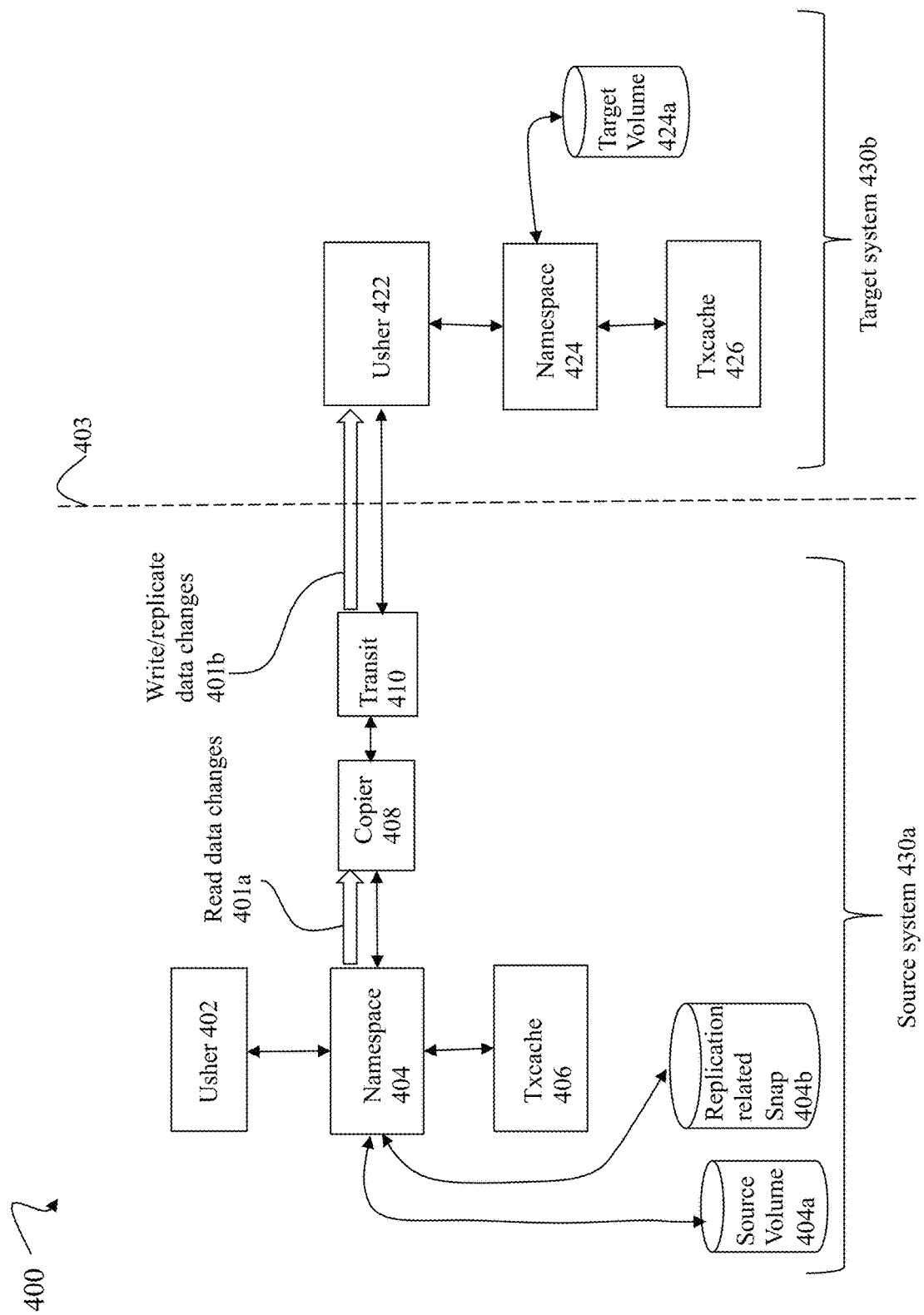
FIG. 6 is an example illustrating use of a snapshot difference technique in connection with asynchronous replication in at least one embodiment in accordance with the techniques of the present disclosure.

Referring to FIG. 6, shown is an example 400 of components in at least one embodiment in accordance with the techniques of the present disclosure. The example 400 illustrates components and associated data and processing flows in connection with asynchronous replication in at least one embodiment.

The example 400 includes source system 430a and target system 430b. Components to the left of line 403 can be included in the source system 430a and components to the right of the line 403 can be included in the target system 430b. In at least one embodiment, an asynchronous replication configuration can include asynchronously replicating data changes or writes made to source volume 404a to the target volume 404b. In at least one embodiment, the snap diff technique discussed herein can be used to periodically take replication related snapshots or snaps, determine data differences between pairs of consecutive replication related snapshot, and write or replicate such data differences from the source system 430a to the target system 430b. In this example 400, such data differences and replication related snapshots of the snap diff technique can be made with respect to the source volume 404a. The data differences or changes can be read, such as from a replication related snapshot or snap 404b, and then replicated or written to the target system 430b and applied to the corresponding target volume 424a. In at least one embodiment, data differences or data changes can be included in one of replication related snapshots such as 404b.

The source system 430a can include the following components: usher 402, namespace 404, Txcache 406, copier 408, transit 410, source volume 404a and replication related snapshot 404b. The target system can include the following components: usher 422, namespace 424, Txcache 426 and target volume 424a. Embodiments can include other components than those illustrated herein for purposes of asynchronous replication workflow. In at least one embodiment, instances of usher 402, 422 can be generally I/O handlers respectively of the source and target systems 430a-b. Instances of namespace 404, 424 can be LVMs respectively of the source and target systems 430a-b. Instances of Txcache 406, 426 can be cache managers respectively of the source and target systems 430a-b. Copier 408 can control the copying of data changes of asynchronous replication from the source system 430a to the target system 430b. In particular, copier 408 can read 401a data changes via requests or calls to namespace 404. Copier 408 can then provide the data changes read to the transit component 410 that writes or replicates 401b the data changes to the target system 430b. In this example 400, the replicated data changes 401b can be received by usher 422 that can write the data changes to the target volume 424a via write operations or requests issued to namespace 424.

Additional detail regarding processing that can be performed by components of the example 400 in at least one embodiment in accordance with the techniques of the present disclosure are described in more detail below with reference to FIG. 7.

In at least one embodiment, the techniques of the present disclosure can use the Runin Txn protocol or operation such as when performing a bufferless read operation. There can be a transactional relationship between namespace and Txcache such as on the source system for both reading and writing operations. In at least one embodiment, namespace such as on the source system can open or begin a transaction on the source system, read the requested read data and commit the transaction. Txcache on the source system can obtain the necessary read locks on the pages of content read for the duration of the transaction on the source system. Consistent with discussion herein, the pages of content being replicated from the source to the target system can remain in cache for the duration of an extended transaction period on the source system that spans from when the transaction is opened or started on the source system by namespace to when the source system receives successful confirmation from the target system regarding receipt of the replicated data. Thus the extended transaction period on the source system also includes replicating the content (e.g., data changes) of the transaction from the source to the target system, and also receiving successful confirmation at the source system from the target system regarding receipt of the replicated data. In at least one embodiment, namespace on the source system can use the bufferless read interface that does not require a preallocated read buffer from the namespace client as a input. In at least one embodiment for bufferless reads, the Runin Txn protocol can provide clients, such as copier, with a pointer or reference directly to the cached pages of content. In at least one embodiment, copier can then replicate the content or data changes read directly from the cache pages thereby avoiding the expensive data copying of content from the cache pages to the pre-allocated read buffer such as can be performed namespace in connection with buffered reads.

Figure 7:
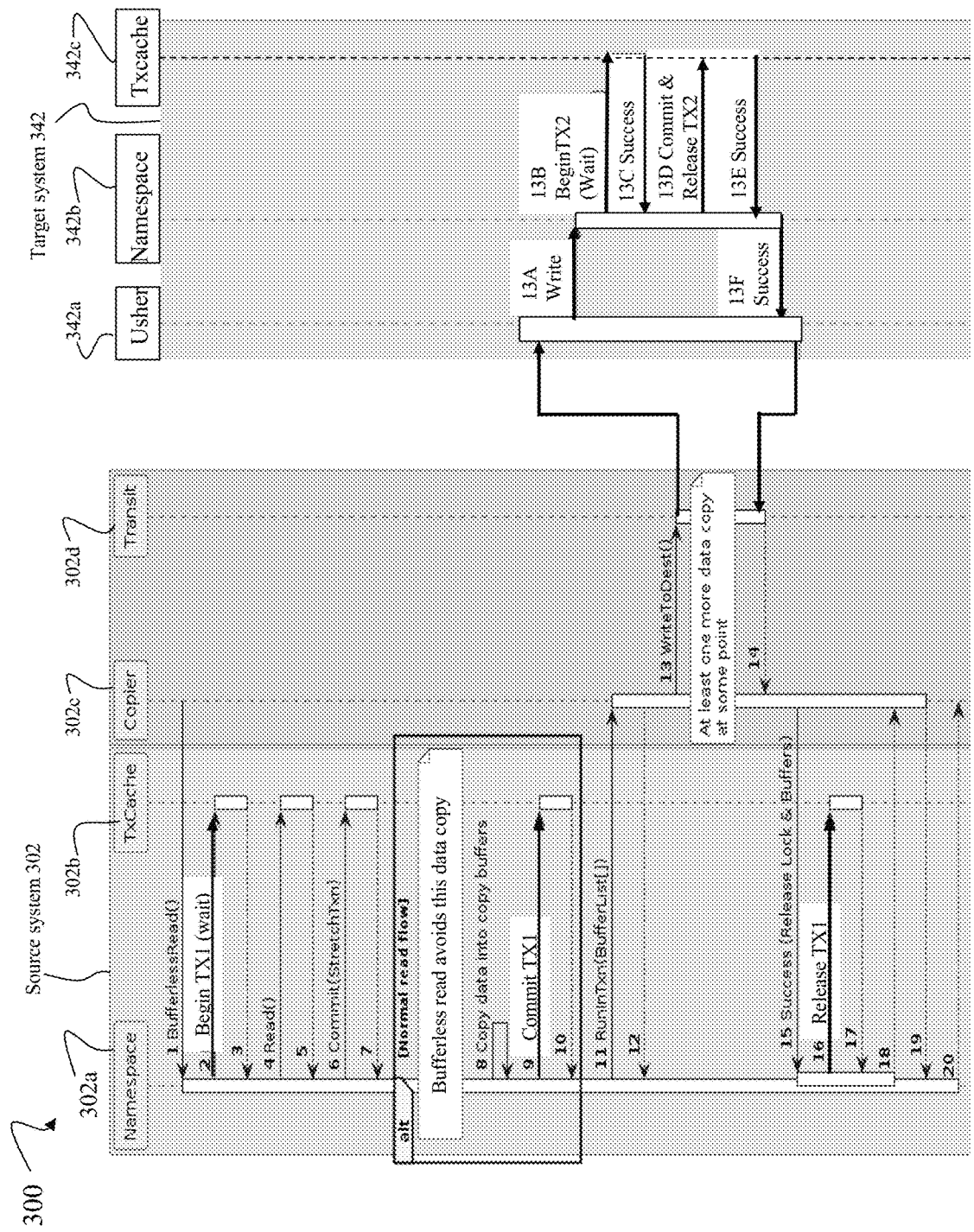
FIG. 7 is a sequence diagram illustrating processing that can be performed in at least one embodiment in accordance with the techniques of the present disclosure.

Referring to FIG. 7, shown is a sequence diagram 300 of components and processing that can be performed in at least one embodiment in accordance with the techniques of the present disclosure. The source system 302 of the sequence diagram 300 includes the following components: namespace 302a, Txcache 302b, copier 302c and transit 302d. The target system of the sequent diagram 300 includes the following components: usher 342a, namespace 342b and Txcache 342c. The components of the source system 302 and target system 342 can correspond to other instances of such components as described elsewhere herein and, for example, as illustrated in FIG. 6.

In at least one embodiment, the bufferless read at (1) can be performed to read data changes included in a set of data differences determined by a snap diff operation with respect to two consecutive related snapshots of a source volume or storage object of the source system 302. The bufferless read can be performed to read the data changes that are then written or replicated from the source system 302 to the target system 342.

The bolded numerals in FIG. 7 indicate an example order of activities or processing performed in at least one embodiment in accordance with the techniques of the present disclosure and are referenced in the following description in parenthesis.

At (1), the copier component 302c issues a bufferless read request to the namespace component 302a on the source system 302. At (2) the namespace component 302a responds by opening a transaction TX1 with Txcache 302b. It is noted that the instruction at (2) can include an option to wait if needed for any resource conflicts, such as for locked pages, to clear. In at least one embodiment, opening the TX1 at (2) can include identifying all pages of data affected by the bufferless read request to read a specified set of data changes such as of one or more pages of user data. A lock can be taken on each such page of data. Since this is a read operation in at least one embodiment, the lock taken on each such page of data can be a read lock. When a read lock is taken of a page, other readers can be allowed to also take a read lock for the same page. However no writers or write locks of the page can be taken while a read lock on the page is held. Similarly, while a write lock on a page is held such as by a writer providing exclusive access to the page, no read lock of the page can be taken. In at least one embodiment, a read lock taken on a page of user data or content can be a specified LBA range lock. If a page that is needed for TX1 is not in cache, the page can be loaded into cache such as from BE non-volatile storage. In at least one embodiment, each page can have a uniform size such as 4 kB. However more generally a page can be any suitable size. At (3), Txcache has successfully opened the transaction TX1 and reports the successful result to namespace.

At (4), namespace 302a issues a read of the data pages needed for the bufferless read request in the context of the transaction TX1 to Txcache 302b. In at least one embodiment, Txcache 302b can manage a persistent cache used to store the data pages. In at least one embodiment, Txcache 302b can acquire and lock the needed number of cache pages for storing the read data pages. At (5), Txcache 302b reports successfully receiving the read request for the pages needed for TX1.

At (6) and (7), the transaction TX1 is committed by namespace 302a by having Txcache 302b update the cache to store the requested pages of data changes of TX1 in the cache. Although TX1 has been committed so that the requested read data (e.g., data changes) is available in cache, the source system continues to hold TX1 open and continues to lock the affected pages of data and also the affected cache pages storing such data. It should be noted that discussion above describes acquiring and locking the cache pages needed for storing the read data or data changes of TX1. As an alternative in at least one embodiment, the cache pages storing the requested data can be initially acquired and locked as part of processing at (7) rather than (4) noted above.

Once the requested read data is committed in (7), processing can continue with (11) and bypass or omit performing the steps (8)-(10) in connection with bufferless read processing. Generally, the steps (8), (9) and (10) can be performed as part of normal read flow such as in connection with a buffered read to copy (8) cached data into client allocated read buffers, where such read buffers can be provided as an input by an invoking or calling client such as with a buffered read. However in this example illustrating processing of the bufferless read processing, the steps (8), (9) and (10) are omitted to thereby avoid performance of the data copying of (8)-(10).

At (11), the copier component 302c receives an instruction to replicate, to the target system 342, the content or data changes read in (4) (and stored in the cache in (6)) in connection with the bufferless read, where the foregoing replication is performed within the context of the currently open transaction TX1. In at least one embodiment, at (11), a callback can be made to the copier component 302c to notify the copier 302c that the requested read data (e.g., data changes) is available and stored in the cache. In at least one embodiment using the bufferless read with asynchronous replication, the requested read data stored in the cache can include data changes that need to be asynchronously replicated from the source to the target system in connection with a set of data changes determined by a periodic snap diff operation. Thus the instruction or notification of (11) sent to copier 302c can include a reference or pointer directly to the cache pages storing the content read or data changes. In the example 300 at (11) in connection with a bufferless read, the BufferList[ ] parameter can denote a list of references or pointers to cache buffers or pages of cache storing the requested read data of data changes to be asynchronously replicated.

At (12), copier sends an acknowledgement to namespace 302a regarding the notification or instruction of (11) received. In connection with the bufferless read, the copier 302c can access the content read (e.g., data changes) directly from cache using the reference(s) or pointer(s) to the cache location(s) provided in (11).

At (13), copier 302c sends or replicates, to the target system 342, the read data denoting the data changes. In this example, copier 302c can provide the data changes by directly accessing the cache pages storing the data changes using the reference or pointer to such cache pages as provided in (11). Copier 302c can provide the data changes to the transit component 302d such as by providing transit 302d with the direct reference or pointer to the cache pages of data changes Transit 302d can generally perform any needed processing to transmit the data changes to the target system 342 in accordance with suitable communication protocols supported between the source system 302 and target system 342. In at least one embodiment, the transit component 302d can also use the reference or pointer to the cache pages to directly access the data changes from the cache for replication to the target system 342.

Thus at (13), transit 302d can generally issue one or more replicating writes to the target system 342. The replicating writes of (13) can be received by usher 342a of the target system 342, where usher 342a can then at (13A) direct the write to namespace 342b. Thus at (13A), usher 342a can direct namespace 342b to proceed with the write to apply the received data changes. At (13B), namespace 342b directs Txcache 342c to open a new transaction TX2. As with the transaction TX1 on the source system 302, opening the new transaction TX2 on the target system 342 can include identifying and accessing all pages affected by the write. Note that at (13B), there can be an instruction to wait if needed for any resource conflicts (e.g., locked pages) to clear. In at least one embodiment, there can be multiple writes processed in parallel by the target system 342 and, as with possible resource conflicts and waiting as described in connection with the source system such as at (2), it may be necessary to wait to acquire the necessary write locks on all local pages on the target system 342 affected by TX2. In at least one embodiment at (13B), Txcache 342c can acquire write locks on all pages to which the data changes or writes are written. As noted elsewhere herein, a write lock on a data page can provide exclusive access of the page to the holder or acquirer of the write lock.

At (13C), Txcache 342c accesses all necessary data pages and associated write locks of affected pages written to and returns success to namespace 342b. At (13D), TX2 is committed by Txcache 342c into the cache of the target system 342. Also at (13D) all locks on local pages affected by TX2 are released. Success of the commit of TX2 is reported back to namespace 342b at (13E) and then back to usher 342a at (13F). Success of the overall replication of the one or more writes to the target system 342 can be reported back to the source system 302 at (14), where such success of (14) can be propagated from transit 302d to copier 302c.

Responsive to copier 302c receiving in (14) the indication of success regarding replication of the writes or data changes of TX1 to the target system 342, copier 302c can inform namespace 302a of the successful replication at (15) and further directing namespace 302a to release all locks taken on pages containing the data changes just replicated of TX1. In particular, the locks released can include the previously taken or acquired read locks of pages such as the page read locks taken in (2) for all pages of content or data changes included in TX1, which was opened in (2) and has remained open the entire time since (2).

Additionally at (15), the locks on cache pages storing the data changes read in connection with TX1 can now be released. The foregoing cache page locks have locked the cache pages storing the data changes for TX1 since (4) (or alternatively (7) noted above) in order to guarantee that the data changes of TX1 corresponding to the requested read content (e.g., read of (4) and also the bufferless read) are retained in cache of the source system for the duration of TX1 so as to be available in the cache when directly accessed by copier 302c at (13) and by other components of the source system 302 for replication to the target system 342.

In at least one embodiment, the steps (13), (13A-13F) and (14) can be performed generally one or more times corresponding respectively to one or more replicated writes from the source system 302 to the target system 342. Thus in at least one embodiment, there can be multiple replicated writes sent from the source system 302 to the target system 342 where, for each replicated write, the steps (13), (13A-F) and (14) can be performed. Subsequent to completing the foregoing for the one or more replicated writes, such as responsive to successful replication at (14) of the last or final replicated write, control can proceed to (15).

At (14) in at least one embodiment, the source system 302 receives an acknowledgement from the target system 342 regarding successful replication of the data changes such as of a replicated write. In at least one embodiment, the acknowledgement at (14) can confirm that the target system 342 has received the replicated data changes and further committed the replicated data changes to the target volume.

In response to receiving the acknowledgement (14) of the final or last replicated write, copier 302c returns indication of the successful replication to namespace 302a at (15) directing namespace to: release locks on cache pages storing the read data (e.g. data changes just replicated) of TX1; and release all locks taken on data pages of the source system as part of TX1, where TX1 was opened at (2) and remained open the entire time since (2). At (16), transaction TX1 is closed with success propagated and reported back in (17), (18), (19) and (20).

Consistent with discussion herein in at least one embodiment, pages, locks and transactions such as described in connection with FIG. 7 can be local to the respective systems 302, 342 and do not extend across systems 302, 342. Thus for example, taking a lock on a particular page of data or content corresponding to an LBA range of a volume or LUN on the source system 302 does not automatically result in a lock being taken on a corresponding page on the target system 342; and rather results in only locally locking the particular data page locally on the source system 302. Similarly taking a lock on a particular page of data or content corresponding to an LBA range of a volume or LUN on the target system 342 does not automatically results in a lock being taken on a corresponding page on the target system 302; and rather results in only locally locking the particular data page locally on the target system 342. Additionally in at least one embodiment, taking a lock or locking cache pages on the source system 302 storing the read content or data changes only retains such data changes in the source system 302's cache. Furthermore in at least one embodiment, each system 302, 342 can be aware of its own local transactions and the status of such transactions. However in at least one embodiment, each of the systems 302, 342 is not automatically aware of transactions and statuses such as those that are opened on the other system. In this manner in at least one embodiment, the activities or processing, such as (13A)-(13F), performed on the target system 342 can proceed without awareness that they are occurring within the context of the still-opened transaction TX1 of the source system 302. Furthermore as noted above, the transaction TX1 of the source system 302 can remain open with its associated data pages of content (e.g., data changes read) locked and its associated cache pages (e.g., storing the data changes read) also locked until the source system 302 receives confirmation that replication of all such data changes to the target system 342 has succeeded.

As noted elsewhere, the techniques of the present disclosure using a bufferless read such as described in connection with FIG. 7 illustrate use of the techniques with copier 302c as the particular read client performing the bufferless read call or request to namespace 302a at (1). More generally, the techniques of the present disclosure with the bufferless read can be performed with respect to any suitable read client performing the bufferless read call or request at (1), where such read client component can perform its own specific processing rather than the particular processing at (13), (13A)-(13F) and (14) as described in the example 300 for copier 302e.

In at least one embodiment, the processing of FIG. 7 with the bufferless read can be performed in connection with asynchronous replication performed in an ongoing manner in accordance with data changes determined periodically in accordance with an RPO using the snap diff technique.

As another example, the processing of FIG. 7 with the bufferless read can be performed in connection with other suitable uses such as to initially synchronize content of the source volume of the source system 302 and the target volume of the target system 342. In at least one embodiment, the source volume and the target volume can be configured in a replication configuration. In at least one embodiment, the source and target volumes can be configured for synchronous replication where initially content of the source and target volumes can be synchronized by performing bufferless reads as described in FIG. 7. In particular, the target volume can be synchronized to have the same content as the source volume by performing the bufferless reads as described in FIG. 7. As another example, if the synchronous replication is fractured or stopped due to a failure, recovery processing can include again synchronizing the content of the source and target volumes where such synchronizing can include performing the bufferless reads as described in FIG. 7.

In at least one embodiment, the buffered read processing described herein can generally perform similar processing as discussed above in connection with FIG. 7 with differences that will now be noted and some of which are also noted elsewhere herein. As a first difference, a preallocated read buffer is provided as an input parameter to the buffered read in (1) rather than no read buffer. The read buffer can be allocated by the namespace client, such as copier or another component, performing the buffered read request or call at (1). A second difference is that steps (8), (9) and (10) are performed with the buffered read where the requested read data is copied from the cache to the read buffer provided as an input parameter in the buffered read request or call. A third difference is that at (11) with the buffered read, the BufferList[ ] can correspond to the read buffer that contains the data to be replicated rather identifying the cache locations or pages storing the data to be replicated. A fourth difference is that the example 300 identifies copier as the particular namespace client performing the bufferless read where with a buffered read, the namespace client performing the buffered read call or request at (1) can generally be any suitable client component. In this case, the fourth difference can be that at (11), the RunIn Txn callback or notification with the BufferList is generally sent to the particular client component that issued the buffered read call or request at (1) which may alternatively perform other processing steps different from (13), (13A)-(13F) and (14). A fifth difference is that with the buffered read, the cache pages storing the content can be unlocked or released and made available for reuse once the data from the cache has been copied into the read buffer by (8). In this case, the processing of (15) accordingly does not need to release the cache pages of read data with a buffered read since such cache pages are previously released after (8) such as, for example, at (9) where namespace 302a can instruct Txcache 302b to release such cache pages at (9).

In at least one embodiment in accordance with the techniques of the present disclosure, both the bufferless read and the buffered read can be utilized. In at least one embodiment, the bufferless read can be used in connection with one or more selected applications or clients, and the buffered read can be utilized in connection with one or more selected applications or clients. Additionally at various times in at least one embodiment, it can be desirable based, at least in part, on the dynamically changing state of the system including cache usage, to use the buffered read rather than the bufferless read or use the bufferless read rather than the buffered read. For example, in at least one embodiment as discussed herein, the bufferless read can be used in connection with reading changed data that is replicated from the source to the target system in connection with asynchronous replication; and the buffered read can be used in connection with a different runtime workflow, processing or usage that can vary with embodiment. Additionally, in at least one embodiment, there can be different times where an evaluation or assessment can be performed as to when to use of a buffered read or a bufferless read. For example in at least one embodiment consistent with other discussion herein, the bufferless read processing retains data changes for asynchronous replication in the cache for an extended source system transactional time period until the data changes have been successfully replicated from the source to the target system and the source system receives acknowledgement regarding the successful replication from the target system. In this scenario, pages of cache storing the data changes remain locked and in use for a longer period of time with the bufferless read than with the buffered read. If, for example, current cache utilization exceeds a maximum threshold or the amount of free cache pages falls below a minimum threshold, it can be desirable to use a buffered read rather than the bufferless read in efforts to reduce cache utilization, increase the amount of free cache pages, and thus reduce contention for the limited cache resource. Although the bufferless read can provide for improved runtime performance by eliminating extra runtime data copying into a preallocated read buffer such as for asynchronous replication, a decision can be made to selectively use the buffered read rather than the bufferless read dynamically at various points in time based, at least in part, on one or more criteria including any one or more of: current cache utilization exceeding a threshold; amount of free cache falling below a threshold; predicted cache utilization exceeding a threshold; current I/O workload; and/or the particular application, read client, and/or runtime workflow. In connection with current I/O workload criteria in at least one embodiment, the current I/O workload can exceed a specified threshold having associated characteristics indicating that a large or increased amount of cache is being used for the I/O workload. For example, if the I/O workload is write heavy (e.g., has a write percentage that is more than a specified threshold such a 50%) an increased amount of cache can be needed to store the write data. In this case, the criteria can indicate to temporarily use buffered reads rather than bufferless reads in connection with asynchronous replication for particular asynchronous replication configurations.

Figure 8B:
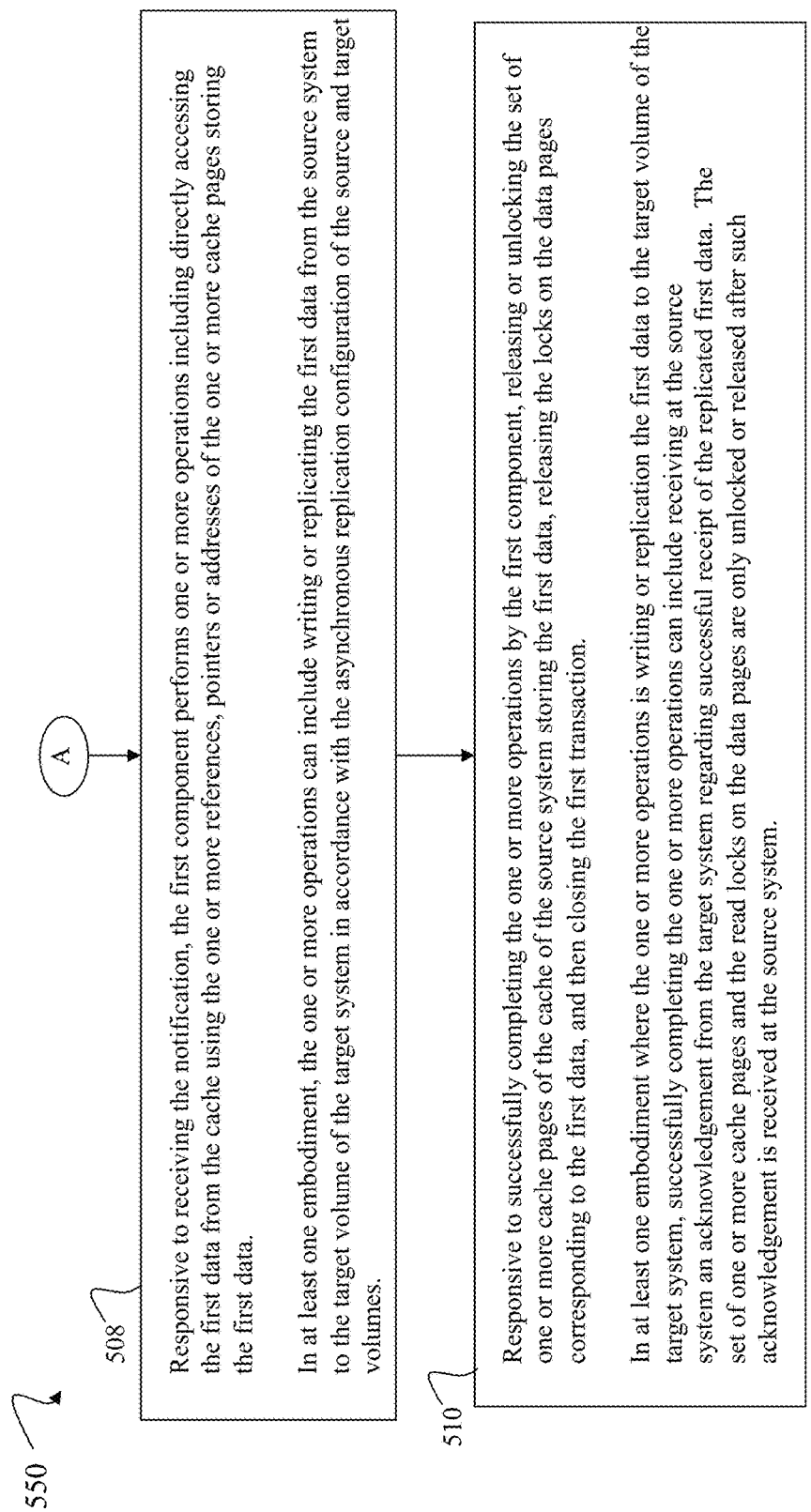

Referring to FIGS. 8A and 8B, shown is a flowchart 500, 550 of processing steps that can be performed in at least one embodiment in accordance with the techniques of the present disclosure. FIGS. 8A and 8B summarize processing discussed above.

At the step 502, processing can include receiving, from a first component, a bufferless read request to read first data from a first logical address LA1. LA1 can be a logical address expressed using a volume or LUN ID (identifier), such as LUN A, and an LBA or offset in the volume. More generally LA1 can refer to any suitable storage object.

In at least one embodiment, the first component can be copier 302c sending the bufferless read request to namespace 302a, where copier 302c and namespace 302a are included in a source system 302. LUN A can be a source volume of the source system configured for asynchronous replication to a corresponding target volume of a target system. The source and target volumes can both be configured to have the same identity of LUN A from the view of an external host or other client where the source and target volumes are exposed to the external host or other client. Paths from the host to the source volume can be active, where the host can issue I/Os directed to LUN A to the source system. Paths from the host to the target volume can be passive where the host cannot issue I/Os directed to LUN A to the target system. From the step 502, control proceeds to the step 504.

At the step 504, responsive to receiving the bufferless read, processing can include opening a first transaction TX1, locking one or more data pages containing the first data, and storing the first data of LA1 in a set of one or more cache pages of a cache. The set of one or more cache pages becomes in the step 504 locked and remains locked for the duration of the first transaction TX1 as denoted while TX1 is open. The cache storing the first data can be included in the source system. The locks taken on the data pages containing the first data can be read locks corresponding to the LBA range of the LA1 where the first data is stored. From the step 504, control proceeds to the step 506.

At the step 506, responsive to storing the first data of LA1 in the set of one or more cache pages, processing can include notifying the first component. The notification can include one or more references, pointers or addresses of the corresponding one or more cache pages storing the requested first data. From the step 506, control proceeds to the step 508.

At the step 508, responsive to receiving the notification, the first component can perform one or more operations including directly accessing the first data from the cache using the one or more references, pointers or addresses of the one or more cache pages storing the first data.

In at least one embodiment, the one or more operations can include writing or replicating the first data from the source system to the target volume of the target system in accordance with the asynchronous replication configuration of the source and target volumes. In such an embodiment where the first component is the copier, the copier can use the one or more pointers, references or addresses to directly access the first data from the source system's cache for replication to the target system. From the step 508, control proceeds to the step 510.

At the step 510, responsive to successfully completing the one or more operations by the first component, processing can be performed that includes: releasing or unlocking the set of one or more cache pages of the cache of the source system storing the first data, releasing the locks on the data pages corresponding to the first data, and then closing the first transaction.

In at least one embodiment where the one or more operations is writing or replication the first data to the target volume of the target system, successfully completing the one or more operations can include receiving at the source system an acknowledgement from the target system regarding successful receipt of the replicated first data as committed to the target volume. The set of one or more cache pages and the read locks on the data pages are only unlocked or released after such acknowledgement is received at the source system from the target system.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   receiving, from a first component, a bufferless read request to read first data from one or more logical addresses of a storage object;
   responsive to receiving the bufferless read request, performing first processing including:
      opening a first transaction;
      acquiring one or more locks of one or more data pages including the first data;
      locking a set of one or more cache pages of a cache; and
      storing the first data in the set of one or more cache pages;
   responsive to storing the first data in the set of one or more cache pages, sending a notification to the first component, wherein the notification identifies one or more references, pointers or addresses of the one or more cache pages of the set storing the first data;
   responsive to receiving the notification, the first component performing one or more operations including directly accessing the first data from the cache using the one or more references, pointers or addresses; and
   responsive to successfully completing the one or more operations, performing second processing including:
      releasing or unlocking the set of one or more cache pages storing the first data;
      releasing the one or more locks of the one or more data pages including the first data; and
      closing the first transaction.

2. The computer-implemented method of claim 1, wherein the first component is a copier component copying a set of data changes of a source volume of a source system to a corresponding target volume of a target system, and wherein the source volume is the storage object identified in the bufferless read request.

3. The computer-implemented method of claim 2, wherein the source volume and the target volume are included in an asynchronous replication configuration where writes or data changes made to the source volume are asynchronously replicated to the target volume.

4. The computer-implemented method of claim 3, further comprising:
taking a plurality of replication snapshots of the source volume on the source system at a plurality of corresponding points in times; and
determining a first set of data changes between a first and a second of the plurality of replication snapshots, where the first and the second of the plurality of replication snapshots are consecutively taken replication snapshots, and wherein the one or more logical addresses of the bufferless read request include at least a portion of the first set of data changes.

5. The computer-implemented method of claim 4, wherein the one or more operations performed by the copier component include directly accessing the first data from the cache using the one or more references, pointers or addresses for replication from the source system to a target volume of the target system.

6. The computer-implemented method of claim 3, wherein the source volume and the target volume are both configured to have a same identity of a logical volume when exposed to a host.

7. The computer-implemented method of claim 6, wherein the source volume is exposed to the host over one or more first paths between the host and the source system and wherein the one or more first paths are designated as active where the host issues I/O requests to the source volume configured as the logical volume over the one or more first paths.

8. The computer-implemented method of claim 7, wherein the target volume is exposed to the host over one or more second paths between the host and the target system and wherein the one or more second paths are designated as passive where the host is unable to issue I/O requests to the target volume configured as the logical volume over the one or more second paths.

9. The computer-implemented method of claim 1, wherein the set of one or more cache pages storing the first data remains locked for the duration of the first transaction thereby resulting in the first data being retained in the cache for the duration of the first transaction while open.

10. The computer-implemented method of claim 1, wherein the one or more locks taken on the one or more data pages including the first data are one or more read locks, and wherein each of the one or more read locks taken on the one or more data pages including the first data is a read lock on a corresponding one of the one or more data pages.

11. The computer-implemented method of claim 10, wherein each of the one or more read locks taken on a corresponding one of the one or more data pages allows additional readers to take corresponding additional read locks on the corresponding one data page but does not allow any writer to take a corresponding write lock on the corresponding one data page.

12. The computer-implemented method of claim 1, further comprising:
dynamically determining, in accordance with one or more criteria, whether the first component performs a first read request that reads the first data using the bufferless read request or a buffered read request.

13. The computer-implemented method of claim 12, wherein the buffered read request includes a read buffer as an input parameter, wherein the read buffer is pre-allocated by a client prior to issuing the buffered read request, and wherein processing of the buffered read request to read second content from one or more locations includes:
storing the second content in the cache;
copying the second content from the cache to the read buffer; and
returning the read buffer with the second content in response to the buffered read request.

14. The computer-implemented method of claim 13, wherein the bufferless read request does not include the read buffer as an input parameter and omits copying requested read data from the cache into the read buffer whereby the requested read data is alternatively directly accessed from the cache.

15. The computer-implemented method of claim 12, wherein the one or more criteria include any one or more of: a current cache utilization of the cache; an amount of free cache; a predicted cache utilization;
and one or more characteristics of a current I/O workload of a system including the cache.

16. The computer-implemented method of claim 12, wherein the one or more criteria specify to selectively use the buffered read request rather than the bufferless read request based, at least in part, on one or more criteria including any one or more of: a current cache utilization exceeding a threshold; an amount of free cache falling below a threshold; a predicted cache utilization exceeding a threshold; a current I/O workload; and/or a particular application or component performing the first read request.

17. The computer-implemented method of claim 1, wherein the storage object is any of: a volume, a logical device, a file, and a file system.

18. A system comprising:
one or more processors; and
a memory comprising code stored thereon that, when executed, performs a method comprising:
receiving, from a first component, a bufferless read request to read first data from one or more logical addresses of a storage object;
responsive to receiving the bufferless read request, performing first processing including:
opening a first transaction;
acquiring one or more locks of one or more data pages including the first data;
locking a set of one or more cache pages of a cache; and
storing the first data in the set of one or more cache pages;
responsive to storing the first data in the set of one or more cache pages, sending a notification to the first component, wherein the notification identifies one or more references, pointers or addresses of the one or more cache pages of the set storing the first data;
responsive to receiving the notification, the first component performing one or more operations including directly accessing the first data from the cache using the one or more references, pointers or addresses; and
responsive to successfully completing the one or more operations, performing second processing including:
releasing or unlocking the set of one or more cache pages storing the first data;
releasing the one or more locks of the one or more data pages including the first data; and
closing the first transaction.

19. A non-transitory computer-readable memory comprising code stored thereon that, when executed, performs a method comprising:
receiving, from a first component, a bufferless read request to read first data from one or more logical addresses of a storage object;

responsive to receiving the bufferless read request, performing first processing including:
  opening a first transaction;
  acquiring one or more locks of one or more data pages including the first data;
  locking a set of one or more cache pages of a cache; and
  storing the first data in the set of one or more cache pages;
responsive to storing the first data in the set of one or more cache pages, sending a notification to the first component, wherein the notification identifies one or more references, pointers or addresses of the one or more cache pages of the set storing the first data;
responsive to receiving the notification, the first component performing one or more operations including directly accessing the first data from the cache using the one or more references, pointers or addresses; and
responsive to successfully completing the one or more operations, performing second processing including:
  releasing or unlocking the set of one or more cache pages storing the first data;
  releasing the one or more locks of the one or more data pages including the first data; and
  closing the first transaction.

* * * * *